United States Patent [19]

Yang et al.

[11] Patent Number: 5,651,029

[45] Date of Patent: Jul. 22, 1997

[54] APPARATUS FOR TRANSMITTING AN OUTPUT WITH PREDETERMINED FREQUENCY RESPONSE TO AN UNSHIELDED TWISTED-PAIR MEDIA AND WAVEFORM SHAPING CIRCUIT AND METHOD EMPLOYED THEREIN

[75] Inventors: Tsen-Shun Yang; Chun-Ming Chou; Wen-Jung Su, all of Hsinchu, Taiwan

[73] Assignee: Myson Technology, Inc., Hsinchu, Taiwan

[21] Appl. No.: 442,203

[22] Filed: May 16, 1995

[51] Int. Cl.$^6$ ............................ H04L 25/03; H04B 3/04
[52] U.S. Cl. ............................................. 375/296; 333/20
[58] Field of Search ................................. 375/296, 229, 375/333; 333/20, 139, 28 R; 327/261, 276, 285

[56] References Cited

U.S. PATENT DOCUMENTS

| | | | |
|---|---|---|---|
| 5,267,269 | 11/1993 | Shih et al. | 375/296 |
| 5,323,157 | 6/1994 | Ledzius et al. | 341/143 |
| 5,388,123 | 2/1995 | Uesugi et al. | 375/234 |
| 5,410,188 | 4/1995 | Segaram | 327/237 |
| 5,444,739 | 8/1995 | Uesugi et al. | 375/229 |

FOREIGN PATENT DOCUMENTS 0 541 225 A1  5/1993  European Pat. Off. .

Primary Examiner—Stephen Chin
Assistant Examiner—Betsy Lee Deppe
Attorney, Agent, or Firm—Neil A. Smith

[57] ABSTRACT

A waveform shaping circuit includes an input terminal, an output terminal, and a plurality of cascaded circuit stages. Each of the cascaded circuit stages includes a delay circuit having an output and an input, a current source, and a switch circuit, connected electrically to the output of the delay circuit and controlled by the delay circuit, for connecting electrically the current source to the output terminal. The input of the delay circuit of a first one of the circuit stages is connected electrically to the input terminal. The input of the delay circuit of remaining ones of the circuit stages is connected electrically to the output of the delay circuit of an immediately preceding one of the circuit stages. The delay circuits have equal delay times. The total delay time provided by the delay circuits of the circuit stages is equal to or is a multiple of half a bit time of the fundamental data rate. The current sources have current values derived from time samples of a finite impulse response of a filter transfer function of the waveform shaping circuit.

8 Claims, 3 Drawing Sheets

APPARATUS FOR TRANSMITTING AN OUTPUT WITH PREDETERMINED FREQUENCY RESPONSE TO AN UNSHIELDED TWISTED-PAIR MEDIA AND WAVEFORM SHAPING CIRCUIT AND METHOD EMPLOYED THEREIN

BACKGROUND OF THE INVENTION

1. Field of the Invention

This invention relates to an apparatus for transmitting an output with predetermined frequency response and waveform shape over a communications media, more particularly to a waveform shaping circuit and method employed in such an apparatus for transmitting Manchester-encoded data to an unshielded twisted-pair media, the waveform shaping circuit and method having a relatively low power consumption and being relatively inexpensive to implement.

2. Description of the Related Art

A conventional apparatus for transmitting Manchester-encoded data to an unshielded twisted-pair media has been disclosed in U.S. Pat. No. 5,267,269 issued to Shih et al. The conventional apparatus includes: a sequencer for receiving data in a non-return-to-zero format and for providing a mode select output and a step select output in response thereto; a memory for storing data representing a plurality of predetermined waveforms; a multiplexer having a first input coupled to the step select output, a second input coupled to the mode select output, an input bus coupled to the memory and an output bus for providing data representing a select waveform from the memory in response to the step and mode select outputs; a latch having an input coupled to the output bus and an output for de-skewing the data representing the select waveform; a differential digital-to-analog converter having an input coupled to an output of the latch and providing a differential analog current output proportional to the select waveform; and driver means including low pass filter means having a differential input coupled to the current output for impressing an analog voltage onto a transmission line.

Although the apparatus disclosed in the aforementioned U.S. Patent provides higher integration level and some cost saving due to elimination of a passive filter, it occupies significant silicon area and consumes large power in view of its complexity. Furthermore, additional circuits are required to generate the high oversampling clocks as only the fundamental bit rate clock is available in the application.

SUMMARY OF THE INVENTION

Therefore, the main objective of the present invention is to provide an apparatus for transmitting Manchester-encoded data to an unshielded twisted-pair media, which apparatus employs a waveform shaping circuit and method that has a relatively low power consumption and that is relatively inexpensive to implement.

According to a first aspect of the present invention, a waveform shaping circuit includes an input terminal, an output terminal, and a plurality of cascaded circuit stages. Each of the cascaded circuit stages includes a delay circuit having an output and an input, a current source, and a switch circuit, connected electrically to the output of the delay circuit and controlled thereby, for connecting electrically the current source to the output terminal. The input of the delay circuit of a first one of the circuit stages is connected electrically to the input terminal. The input of the delay circuit of remaining ones of the circuit stages is connected electrically to the output of the delay circuit of an immediately preceding one of the circuit stages. The delay circuits have equal delay times. The current sources have current values derived from time samples of a finite impulse response of a filter transfer function of the waveform shaping circuit. The number of the stages, hence the total delay time provided by the delay circuits, depends on the accuracy requirement of the transfer function.

Preferably, the filter transfer function of the waveform shaping circuit has a raised-cosine impulse response. In addition, the total delay time is equal to or is a multiple of half a bit time of the fundamental data rate.

In a second aspect of the present invention, a waveform shaping method includes the steps of: (a) obtaining time samples by sampling a finite impulse response of a filter transfer function; (b) providing a plurality of current sources having current values derived from the time samples, each of the current sources having a switch circuit; and (c) providing a plurality of delay circuits having equal delay times. An input of a first one of the delay circuits receives input data. An input of remaining ones of the delay circuits is connected electrically to an output of an immediately preceding one of the delay circuits. The output of each of the delay circuits is connected electrically to the switch circuit of a respective one of the current sources so as to control the latter to connect the respective one of the current sources to an output terminal.

In a third aspect of the present invention, an apparatus is used to transmit Manchester-encoded data to an unshielded twisted-pair media and includes first, second, third and fourth waveform shaping circuits. Each of the waveform shaping circuits includes an input terminal, an output terminal, and a plurality of cascaded circuit stages. Each of the cascaded circuit stages includes: a delay circuit having an output and an input; a current source; and a switch circuit, connected electrically to the output of the delay circuit and controlled thereby, for connecting electrically the current source to the output terminal. The input of the delay circuit of a first one of the circuit stages is connected electrically to the input terminal. The input of the delay circuit of remaining ones of the circuit stages is connected electrically to the output of the delay circuit of an immediately preceding one of the circuit stages. The delay circuits have equal delay times. The total delay time provided by the delay Circuits of the circuit stages is equal to half a bit time of the Manchester-encoded data. The current sources have current values derived from time samples of a finite impulse response of a filter transfer function of the waveform shaping circuit.

The input terminal of the first waveform shaping circuit receives the Manchester-encoded data. The input terminal of the second waveform shaping circuit receives delayed Manchester-encoded data. The output terminal of the second waveform shaping circuit is connected electrically to the output terminal of the first waveform shaping circuit. The input terminal of the third waveform shaping circuit receives inverted Manchester-encoded data. The input terminal of the fourth waveform shaping circuit receives delayed and inverted Manchester-encoded data. The output terminal of the fourth waveform shaping circuit is connected electrically to the output terminal of the third waveform shaping circuit.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
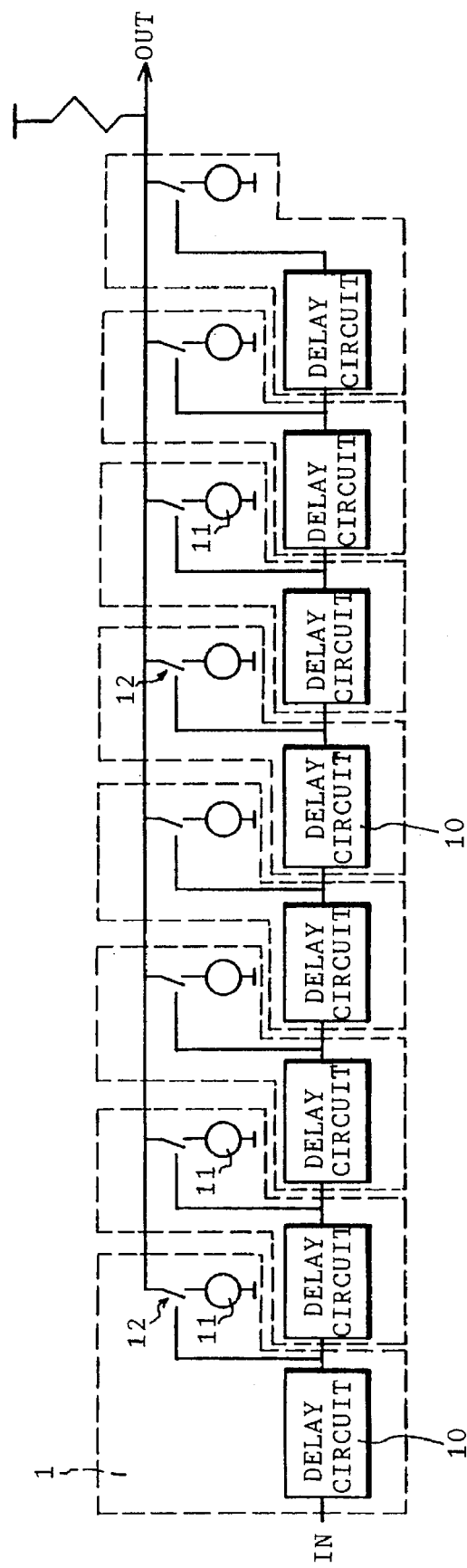
FIG. 1 is a schematic block diagram of a waveform shaping circuit according to the present invention.
Figure 2:
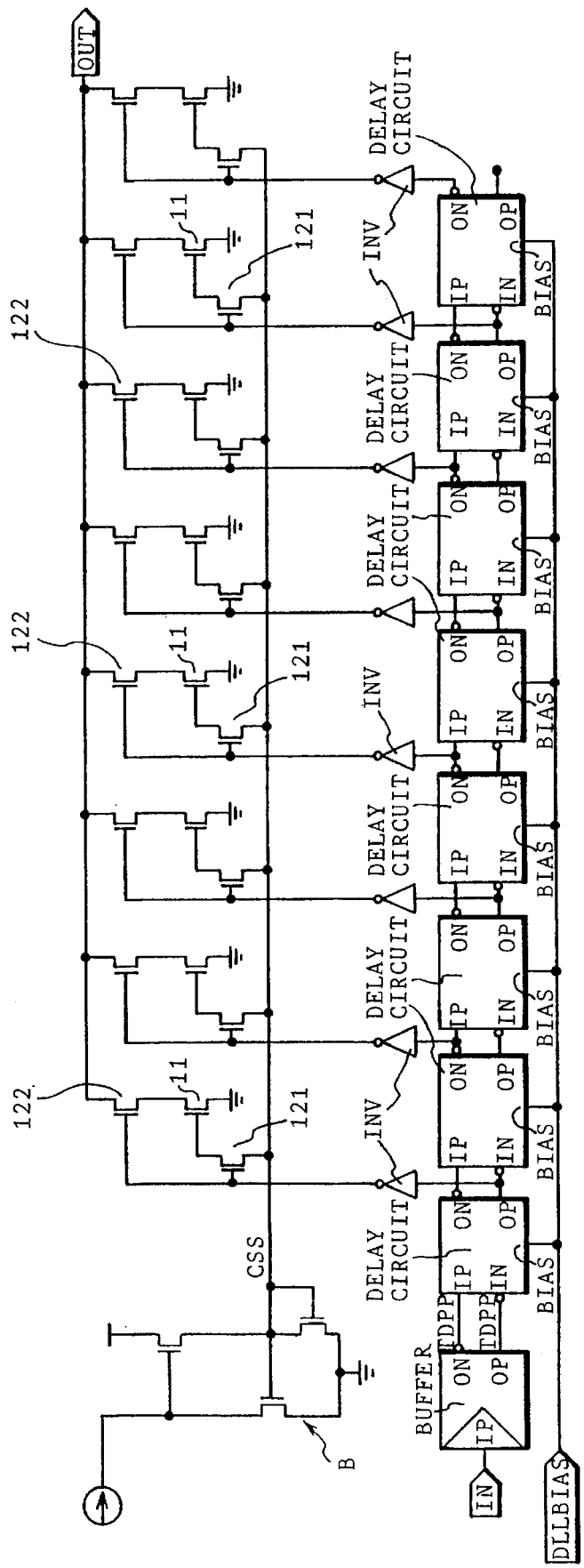
FIG. 2 is a schematic circuit diagram of the waveform shaping circuit according to the present invention.

Referring to FIGS. 1 and 2, a waveform shaping circuit in accordance with the present invention includes an input terminal (IN) for receiving input data (not shown), an output terminal (OUT), and a plurality of cascaded circuit stages 1.

Each of the cascaded circuit stages 1 includes a delay circuit 10, a current source 11 and a switch circuit 12. Each of the delay circuits 10 has an output and an input. In the present embodiment, the delay circuits 10 are complementary delay circuits, the input of each delay circuit 10 has first and second input sections (IP,IN), and the output of each delay circuit 10 has first and second output sections (ON, OP). The input of the delay circuit 10 of a first one of the circuit stages 1 is connected electrically to the output of a buffer (B) which is connected electrically to the input terminal (IN) so as to receive the input data and which outputs positive signal to one of the input sections (IP,IN) of the first one of the circuit stages 1 and further outputs negative signal to the other one of the input sections (IP,IN) of the first one of the circuit stages 1. The input sections (IP,IN) of the input of the delay circuit 10 of remaining ones of the circuit stages 1 are connected respectively and electrically to the output sections (ON,OP) of the output of the delay circuit 10 of an immediately preceding one of the circuit stages 1. The delay circuits 10 have equal delay times.

The current sources 11 of the circuit stages 1 have current values derived from time samples of a finite impulse response of a filter transfer function of the waveform shaping circuit. For a causal system, the impulse response should be symmetrical to the time axis. In the present embodiment, the filter transfer function has a raised-cosine impulse response. This, in general, will yield minimum inter-symbol interference over long transmission media. The total number of delay stages and the stage delay depend on the accuracy requirement of the transfer function. Each of the current sources 11 is a MOS transistor having a grounded source terminal with its gate connected to a current source reference voltage.

The switch circuit 12 of each of the circuit stages 1 consists of first and second MOS transistors 121 and 122. The gate terminals of the MOS transistors 121,122 of the switch circuit 12 of each circuit stage 1 are connected electrically to one of the output sections (ON,OP) of the output of the delay circuit 10 of the respective circuit stage 1 via an inverter (INV). The drain terminal of the second transistor 122 of each switch circuit 12 is connected electrically to the output terminal (OUT) of the waveform shaping circuit, while the source terminal of the same is connected electrically to the drain terminal of the respective current source 11. The drain terminal of the first transistor 121 of each switch circuit 12 is connected electrically to the gate terminal of the respective current source 11, while the source terminal of the same is connected to a bias circuit (B) which provides a current source reference voltage (CSS) to the first transistors 121 of the switch circuits 12. Each of the switch circuits 12 is controlled by the respective delay circuit 10 so as to connect electrically the respective current source 11 to the output terminal (OUT). It should be noted that summation of the outputs of the current sources 11 forms an output at the output terminal (OUT).

It should be appreciated that when a higher number of delay circuits and the finer stage delay are employed, a more precise transfer function can be implemented.

Figure 3:
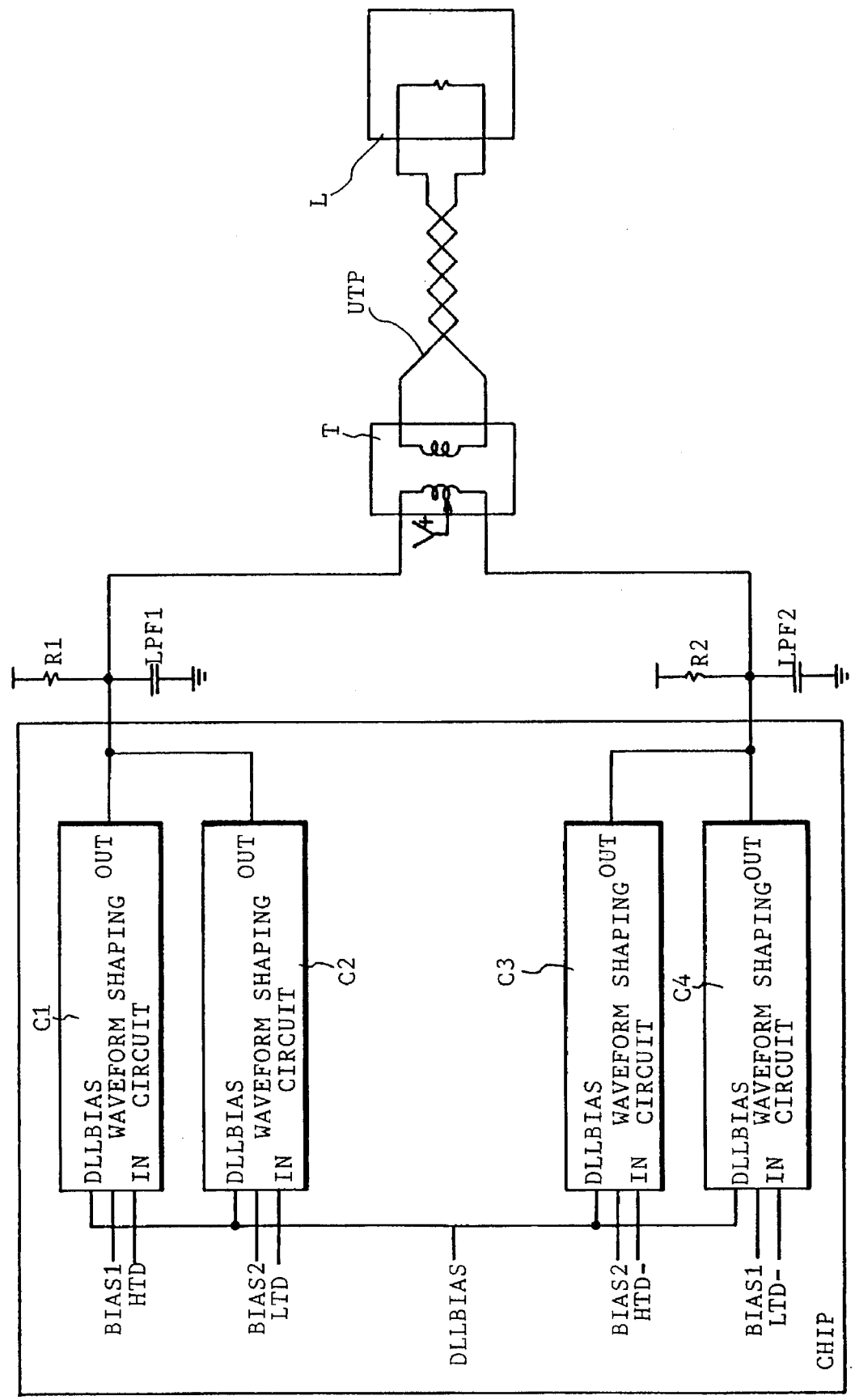
FIG. 3 is a schematic block diagram of an apparatus which transmits Manchester encoded data to an unshielded twisted-pair media and which employs a plurality of the waveform shaping circuits shown in FIG. 1.

Referring now to FIG. 3, an apparatus for transmitting Manchester-encoded data to an unshielded twisted-pair media (UTP) is shown. The apparatus includes first, second, third and fourth waveform shaping circuits (C1,C2,C3,C4). The waveform shaping circuits (C1,C2,C3,C4) are identical in circuit implementation and are similar to that described hereinbefore so that detailed descriptions thereof are omitted herein. The total delay time provided by the delay circuits of each of the waveform shaping circuits (C1,C2,C3,C4) is equal to or is a multiple of half a bit time of the fundamental data rate of Manchester-encoded data. In the present embodiment, the buffer of the first waveform shaping circuit (C1) receives the Manchester-encoded data (HTD). The buffer of the second waveform shaping circuit (C2) receives delayed Manchester-encoded data (LTD). The output terminal (OUT) of the second waveform shaping circuit (C2) is connected electrically to the output terminal (OUT) of the first waveform shaping circuit (C1). The buffer of the third waveform shaping circuit (C3) receives inverted Manchester-encoded data (HTD-). The buffer of the fourth waveform shaping circuit (C4) receives delayed and inverted Manchester-encoded data (LTD-). The output terminal (OUT) of the fourth waveform shaping circuit (C4) is connected electrically to the output terminal (OUT) of the third waveform shaping circuit (C3). The waveform shaping circuits (C1,C2,C3,C4) are identical in circuit implementation. The first waveform shaping circuit (C1) and the fourth waveform shaping circuit (C4), and the second waveform shaping circuit (C2) and the third waveform shaping circuit (C3) are complementary in nature to form differential output signals for driving an isolation transformer (T). The bias levels (BIAS1) to the first and fourth waveform shaping circuits (C1 and C4) and the bias level (BIAS2) to the second and third waveform shaping circuits (C2 and C3) are different so as to provide a ratio between the output current between the nondelayed and delayed Manchester signals. In general, the ratio is between 5:1 to 3:1 for nondelayed: delayed signals to provide predistortion, commonly called transmit equalization, to reduce the signal jitter at the far receiving end.

The apparatus further includes a first low pass filter (LPF1) connected electrically to the output terminals (OUT) of the first and second waveform shaping circuits (C1 and C2), a second low pass filter (LPF2) connected electrically to the output terminals (OUT) of the third and fourth waveform shaping circuits (C3 and C4), and an isolation transformer (T) having a primary coil and a secondary coil. The primary coil has a first terminal connected electrically to the first low pass filter (LPF1), a second terminal connected electrically to the second low pass filter (LPF2) and a third terminal which is the center tap of the primary coil and which is connected to the positive supply (V+). The low pass filters (LPF1,LPF2) are used to smooth out the time sampling effect of the waveform shaping circuits (C1 to C4) so as to effectively remove any high frequency component in the output spectrum. The secondary coil has output terminals adapted to be connected electrically and respectively to the unshielded twisted-pair media (UTP) which is connected to a load (L).

It should be noted that the first transistors of the first and fourth waveform shaping circuits (C1 and C4) are biased by a first bias voltage (BIAS1), while the first transistors of the second and third waveform shaping circuits (C2 and C3) are biased by a second bias voltage (BIAS2). The level of precompensation is set by the two bias voltages (BIAS1, BIAS2). Since the outputs of the waveform shaping circuits (C1,C2,C3,C4) are in the form of a current source, output voltage is developed by external load resistors (R1,R2) which also function as the source termination for any reflected signal from the unshielded twisted-pair media (UTP).

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

We claim:

1. A waveform shaping circuit, comprising:

an input terminal;

an output terminal; and a plurality of cascaded circuit stages, each of said cascaded circuit stages including: a delay circuit having an output and an input; a current source; and a switch circuit, connected electrically to said output of said delay circuit and controlled by said delay circuit, for connecting electrically said current source to said output terminal, said input of said delay circuit of a first one of said circuit stages being connected electrically to said input terminal, said input of said delay circuit of remaining ones of said circuit stages being connected electrically to said output of said delay circuit of an immediately preceding one of said circuit stages;

said delay circuits having equal delay times;

said current sources having current values derived from time samples of a finite impulse response of a filter transfer function of said waveform shaping circuit.

2. A waveform shaping circuit as claimed in claim 1, wherein said filter transfer function has a raised-cosine impulse response.

3. A waveform shaping method for Manchester-encoded data, comprising the steps of:

(a) obtaining time samples of a finite impulse response of a filter transfer function;

(b) providing a plurality of current sources having current values proportional to said time samples, each of said current sources having a switch circuit; and (c) providing a plurality of delay circuits having equal delay times, total delay time provided by said delay circuits being equal to half a bit time of the Manchester-encoded data, an input of a first one of said delay circuits receiving the Manchester-encoded data, an input of remaining ones of said delay circuits being connected electrically to an output of an immediately preceding one of said delay circuits, said output of each of said delay circuits being further connected electrically to said switch circuit of a respective one of said current sources so as to control said switch circuit of said respective one of said current sources to connect said respective one of said current sources to an output terminal.

4. A waveform shaping method as claimed in claim 3, wherein said filter transfer function has a raised-cosine impulse response.

5. An apparatus for transmitting Manchester-encoded data to an unshielded twisted-pair media, comprising:

first, second, third and fourth waveform shaping circuits, each of which including an input terminal, an output terminal, and a plurality of cascaded circuit stages, each of said cascaded circuit stages including: a delay circuit having an output and an input; a current source; and a switch circuit, connected electrically to said output of said delay circuit and controlled by said delay circuit, for connecting electrically said current source to said output terminal, said input of said delay circuit of a first one of said circuit stages being connected electrically to said input terminal, said input of said delay circuit of remaining ones of said circuit stages being connected electrically to said output of said delay circuit of an immediately preceding one of said circuit stages, said delay circuits having equal delay times, total delay time provided by said delay circuits of said circuit stages being equal to half a bit time of the Manchester-encoded data, said current sources having current values derived from time samples of a finite impulse response of a filter transfer function of said waveform shaping circuit, said input terminal of said first waveform shaping circuit receiving the Manchester-encoded data, said input terminal of said second waveform shaping circuit receiving delayed Manchester-encoded data, said output terminal of said second waveform shaping circuit being connected electrically to said output terminal of said first waveform shaping circuit, said input terminal of said third waveform shaping circuit receiving inverted Manchester-encoded data, said input terminal of said fourth waveform shaping circuit receiving delayed and inverted Manchester-encoded data, said output terminal of said fourth waveform shaping circuit being connected electrically to said output terminal of said third waveform shaping circuit.

6. An apparatus as claimed in claim 5, wherein said filter transfer function has a raised-cosine impulse response.

7. An apparatus as claimed in claim 5, further comprising a first low pass filter connected electrically to said output terminals of said first and second waveform shaping circuits and a second low pass filter connected electrically to said output terminals of said third and fourth waveform shaping circuits.

8. An apparatus as claimed in claim 7, further comprising an isolation transformer having a primary coil and a secondary coil, said primary coil having a first terminal connected electrically to said first low pass filter, a second terminal connected electrically to said second low pass filter, and a third terminal that is adapted to be connected to a positive power supply and that serves as a center tap of said primary coil, said secondary coil having output terminals adapted to be connected electrically and respectively to the unshielded twisted-pair media.

* * * * *